United States Patent [19]

Parellada Ferrer et al.

[11] Patent Number: 5,583,185
[45] Date of Patent: Dec. 10, 1996

[54] PROCESS FOR HYDROGENATION IN SOLUTION OF THE DOUBLE BONDS OF CONJUGATED DIENES, AND HYDROGENATED BLOCK COPOLYMER PRODUCED

[75] Inventors: Maria D. Parellada Ferrer; Juan A. Barrio Calle, both of Madrid, Spain

[73] Assignee: Repsol Quimica S.A., Madrid, Spain

[21] Appl. No.: 393,272

[22] Filed: Feb. 23, 1995

Related U.S. Application Data

[63] Continuation-in-part of Ser. No. 147,077, Nov. 3, 1993, abandoned.

[30] Foreign Application Priority Data

Nov. 3, 1992 [ES] Spain ............................ P9202219

[51] Int. Cl.$^6$ ............................................. C08F 8/04
[52] U.S. Cl. ................. 525/338; 525/332.9; 525/331.1; 525/333.2
[58] Field of Search ........................ 525/338, 332.9, 525/331.1, 333.2, 332.9

[56] References Cited

U.S. PATENT DOCUMENTS

| | | | |
|---|---|---|---|
| 4,501,857 | 2/1985 | Kishimoto | 525/338 |
| 4,980,421 | 12/1990 | Taremoto | 525/338 |
| 5,141,997 | 8/1992 | Chamberlain | 525/338 |
| 5,206,307 | 4/1993 | Chamberlain | 525/338 |

OTHER PUBLICATIONS

Beachell, et al, NMR Spectra of Titanocene Sandwich Compounds, Inorganic Chemistry, V4, No. 8, Aug. 1965, pp. 1133–1140.

Calhorda, et al. Enthalpies of Formation of $Ti(2-C_5H_5)_2L_2$ Complexes, J. of Organomet. Chem, 225, 1983, pp. 81–86.

*Primary Examiner*—Joseph L. Schofer
*Assistant Examiner*—I. Zemel
*Attorney, Agent, or Firm*—Eliot S. Gerber

[57] ABSTRACT

A process of hydrogenation in solution of polymers of conjugated dienes in the presence of homogeneous catalysts which contain, as an essential component, a titanium compound of the type $Cp_2Ti(PhOR)_2$, where Cp is a cylopentadienyl group, ph a phenyl group, and OR an alkoxide group containing 1 to 4 carbon atoms; or a titanium compound of the type $Cp_2TiR_2$, where R is a $Ch_2PPh_2$ group.

These catalysts are very active in the selective hydrogenation of the double bonds of the diene units of polymers or copolymers of conjugated dienes having number-averaged molecular weights or between approximately 500 and 1,000,000 and, in particular, of random and block copolymers of styrene and butadiene or isoprene, the latter containing at least one styrene block and one polybutadiene and/or polyisoprene block.

11 Claims, No Drawings

PROCESS FOR HYDROGENATION IN SOLUTION OF THE DOUBLE BONDS OF CONJUGATED DIENES, AND HYDROGENATED BLOCK COPOLYMER PRODUCED

RELATED APPLICATION

This is a continuation-in-part application partly based on application Ser. No. 08/147,077, filed Nov. 3, 1993, now abandoned.

BACKGROUND OF THE INVENTION

The present invention relates to a process of hydrogenation of the double bonds of the diene units of polymers in the presence of new homogeneous titanium catalysts which are highly soluble in organic solvents and are endowed with a high activity even in the absence of reducing agents. More specifically, the present invention relates to the use of hydrogenation catalysts based on titanium compounds of the type $Cp_2Ti(PhOR)_2$, where Cp represents a cyclopentadienyl group, Ph a phenyl group, and OR is an alkoxide group containing 1 to 4 carbon atoms and preferentially occupying the 3 or 4 position of the aromatic ring; or on titanium compounds of the type $Cp_2TiR_2$, where R is a $-CH_2PPh_2$ group, and to the process of hydrogenation of double bounds of polymers and copolymers of conjugated dienes under mild reaction conditions.

Numerous catalysts are known for the hydrogenation of compounds containing unsaturated double bonds, catalysts which may be classified into two groups:

(1) Heterogeneous catalysts, generally consisting of a metal such as Ni, Pd, Pt, Ru, etc. deposited on a support such as carbon, silica, alumina, calcium carbonate, etc.; and (2) Homogeneous catalysts such as (a) Ziegler catalysts consisting of a combination of an organic salt of Ni, Co, Fe, Cr, etc., and a reducing agent such as the organoaluminum compounds and the like, and (b) organometallic compounds of Ru, Rh, Ti, La, etc.

Heterogeneous catalysts are widely used in industry, but compared with the homogeneous catalysts they are less active and hence, in order to carry out the desired hydrogenation with these heterogeneous catalysts, large quantities of catalyst are needed and the reaction must be carried out at relatively high pressures and temperatures. The homogeneous catalysts are generally more active; a small amount of catalyst is sufficient, and the hydrogenation reaction can be carried out under milder pressure and temperature conditions. Nevertheless, homogeneous catalysts have the disadvantage that their stability is not sufficient and the separation of the catalyst or its decomposition products from the hydrogenated products can be complicated and costly.

Polymers of conjugated dienes such as 1,3-butadiene and isoprene and the copolymers of these dienes with vinylaromatic monomers, e.g. with styrene, are widely used in industry as elastomers. These polymers contain double bonds in their chain, which permit their vulcanization, but whose presence causes a low resistance to aging and oxidation. Some block copolymers of conjugated dienes and vinylaromatic hydrocarbons are used without vulcanization as thermoplastic elastomers, as transparent impact-resistant resins, or as modifiers or compatibilizers of polystyrene and polyolefin resins. However these copolymers have a low resistance to aging and oxidation by atmospheric oxygen and by ozone, due to the presence of double bonds in their chain. Hence the use of these copolymers in applications requiring exposure to the external environment is limited. The resistance to oxidation by oxygen and ozone, and, in general, the resistance to aging, may be considerably improved by hydrogenating these polymers to obtain total or partial saturation of the double bonds. Numerous processes have been proposed for the hydrogenation of polymers which contain olefinic double bonds. Two types of processes are generally involved: those which use the aforementioned supported heterogeneous catalysts, and those using homogeneous catalysts of the Ziegler type or organometallic compounds of rhodium and titanium.

In the processes using supported heterogeneous catalysts, the polymer to be hydrogenated is first dissolved in a suitable solvent and then contacted with hydrogen in the presence of the heterogeneous catalyst. The contact of the reactants with the catalyst is difficult due to the relatively high viscosity of the polymer solution, to steric hindrances of the polymer chain, and to the high adsorption of the polymer which, once hydrogenated, tends to remain on the surface of the catalyst, interfering with the access to the active centers of the nonhydrogenated polymer. Hence, to achieve complete hydrogenation of the double bonds, large quantities of catalyst and severe reaction conditions are required, which usually cause decomposition and gelification of the polymer. Furthermore, in the hydrogenation of copolymers of conjugated dienes with vinylaromatic hydrocarbons the aromatic nuclei are also hydrogenated, and it is difficult to effect a selective hydrogenation of the double bonds of the polydiene units. Likewise, the physical separation of the catalyst from the solution of hydrogenated polymer is extremely difficult, and in some cases a complete elimination is impossible due to the strong adsorption of the polymer on the heterogeneous catalyst.

In processes using Ziegler-type catalytic systems the reaction takes place substantially in a homogeneous medium, and hence the hydrogenation may be carried out under mild pressure and temperature conditions. Moreover, by adequately selecting the conditions of hydrogenation it is possible to selectively hydrogenate the double bonds of the chains of the copolymers of conjugated dienes and vinylaromatic hydrocarbons without hydrogenating the aromatic rings. Nevertheless the elimination of the catalyst residues from the reaction products—which is absolutely necessary because these residues have an unfavorable effect on the stability of the hydrogenated polymers—is a complicated and costly step. Other processes using other homogeneous catalysts, e.g. the rhodium compounds described in U.S. Pat. No. 3,898,208 and in the patent JP 01.289,805 have the disadvantage of the high cost of the rhodium catalysts.

It is known that hydrogenation catalysts in which one of the components is a derivative of cyclopentadienyltitanium (U.S. Pat. No. 4,501,857) are used—necessarily in the presence of organolithium compounds—for the hydrogenation of the olefinic double bonds of the polymers of conjugated dienes. U.S. Pat. No. 5,039,755 described the hydrogenation of polymers that had been synthesized by means of an organolithium compound and which have been completed by the addition of hydrogen, the presence of the lithium hydride formed in the final reaction being necessary in this case. The examples of both patents use the compound $Cp_2TiCl_2$, which is not soluble in inert organic solvents and which has a tendency to hydrolize, thus forming hydrogen chloride which may cause corrosion of equipment.

Likewise, in British Patent Application No. 2,159,819 A, it is indicated that species of the $Cp_2TiR_2$ type (R=alkylaryl groups) are catalysts capable of selectively hydrogenating the double bonds of polymers and copolymers of conjugated dienes, without requiring the presence of an organolithium compound.

Finally, European Patent No. 434,469 A2 describes the use of an extraordinary complex catalytic system, comprising a biscyclopentadienyltitanium compound in combination with an organometallic compound of aluminum or magnesium and alkaline metals in the presence of alkoxides of alkaline metals and polar compounds of ether, keton, sulfoxide, etc. type. Said catalytic system is capable of hydrogenating the double bonds of polymers and copolymers of conjugated dienes.

To obtain more economical hydrogenation process, present-day industry feels the need of having homogeneous catalysts available which are more effective than those currently known, which are stable, simple and active in concentrations that are sufficiently low so as to be able to avoid the costly step of elimination of catalyst residues form the hydrogenated polymers.

SUMMARY OF THE INVENTION

On our part, we have discovered that, surprisingly, titanium compounds of the type $Cp_2Ti(PhOR)_2$, wherein Cp is a cyclopentadienyl group, Ph a phenyl group and OR an alkoxide group containing between 1 and 4 carbon atoms, and titanium compounds of the type $Cp_2TiR_2$ wherein R is a—$CH_2PPh_2$ group, are homogeneous catalysts, very soluble in inert organic solvents, which, consequently, are easily handled in solution form and are very active in the hydrogenation. The catalysts of the type $Cp_2Ti(PhOR)_2$ are highly stable catalysts, also in solution, and retain their activity even several months after their preparation. These catalysts are capable of selectively hydrogenating the double bonds of the diene units in polymers and copolymers of conjugated dienes with vinylaromatic monomers having number-averaged molecular weights of between approximately 500 and 1,000,000 and in particular, of random copolymers and block copolymers of styrene-butiaene or isoprene which contain at least one styrene block and one polybutadiene or polyisoprene block.

Because of the high activity of these catalysts the consumption of catalyst per unit weight of hydrogenated polymer will be very low, which is reflected in a very reduced cost of catalyst. On the other hand, at the low catalyst concentrations that are usually required in accordance with the invention, it is not necessary to eliminate the catalyst residues from the hydrogenated polymer, since they do not have an unfavorable influence on the properties of said polymers. As indicated above, this fact is advantageous from the industrial point of view, particularly in the hydrogenation of polymers and copolymers of conjugated dienes, since it permits a substantial simplification of the process.

DETAILED DESCRIPTION OF THE INVENTION

Specific examples of catalysts useful within the framework of the invention include bis-(4-methoxyphenyl)-bis-($n^5$-cyclopentadienyl) titanium, bis-(3-methoxyphenyl)-bis-($n^5$-cyclopentadienyl)titanium, bis-(4-ethoxyphenyl)-bis-($n^5$-cyclopentadienyl)titanium, bis-(3-ethoxyphenyl)-bis-($n^5$-cyclopentadienyl)titanium, etc., and bis-(diphenylphosphinomethylene)-bis-($n^5$-cyclopentadienyl)titanium.

The hydrogenation catalysts in accordance with the present invention may be synthesized according to the methods described by H. C. Beachell and S. A. Butter, Inorg. Chem. 4, 1133 (1965), and M. Etiene, R. Choukon e al., Nouveau Journal Chimie 8, 531–34 (1984).

These catalysts are capable of selectively hydrogenating the double bonds of diene units in polymers or copolymers of conjugated dienes having average molecular weights of between approximately 500 and 1,000,000, and particularly copolymers of a conjugated diene such as 1,3-butadiene or isoprene with vinylaromatic compounds such as styrene or α-methylstyrene. These copolymers include the statistical copolymers in which the comonomers are distributed at random along the polymer chain, the insertion copolymers, and the pure or gradual block copolymers.

The block copolymers are especially interesting since some of them are thermoplastic elastomers useful from the industrial point of view. Such block copolymers consist of a) at least one polymer block A formed by polymerization of an aromatic hydrocarbon with a vinylic substituent, such as styrene or α-methylstyrene, and b) ar least one polymer block B formed by polymerization of conjugated dienes, such as 1,3-butadiene or isoprene. These block copolymers include copolymers of the linear, branched and radial type, and star block copolymers obtained by coupling linear block copolymers with a coupling agent. The block copolymers preferentially used in the present invention are those containing between 10 and 90% by weight of vinylaromatic hydrocarbon. Particularly preferred are those copolymers whose content of 1,2-vinyl bonds in the conjugated diene units is comprised between approximately 25 and 75%.

When block copolymers of these characteristics are hydrogenated, the polydiene blocks are converted into polyolefinic blocks in such a way that the copolymers behave like thermoplastic elastomers of great industrial value.

The polymers of conjugated dienes and copolymers of conjugated dienes which may be hydrogenated in accordance with the present invention can be obtained by known polymerization methods such as anionic polymerization, cationic polymerization, coordination polymerization, radical polymerization., etc., by solution, emulsion or bulk processes. Anionic polymerization is of particular interest for producing polymers and copolymers that may be hydrogenated in accordance with the present invention. Among the initiators that may be used, preference is given to organolithium compounds, particularly butyllithium. The synthesis of diene polymers may also be advantageously carried out with combinations of barium, magnesium or aluminum compounds, e.g. barium alkoxides or alkyl phosphates, alkylmagnesium compounds and trialkylaluminum compounds (Spanish Patent No. P-9001799).

Living polymers containing active lithium at the end of the polymer chain may also be hydrogenated, although the presence of living polymer is not essential within the framework of the present invention. Living polymers are produced by anionic polymerization using an organolithium compound as initiator. The catalysts used in the preparation of living polymers are hydrocarbon compounds which contain at least one lithium atom in their molecule. Typical examples are n-butyllithium, sec.-butyllithium, etc.

In accordance with a preferred method within the framework of the present invention, the hydrogenation reaction of the unsaturated polymer is carried out in solution in an inert solvent. The term "inert solvent" signifies an organic solvent that does not react with any of the reactants participating in the reaction. Examples of inert solvents whose use is recommended within the framework of the invention are aliphatic and cycloaliphatic hydrocarbons such as n-hexane, n-octane, isooctane, cyclohexane, methylcyclopentane, ethers such as tetrahydrofuran, aromatic hydrocarbons such as benzene, toluene, xylenes, etc., which are not hydrogenated under the reaction conditions selected, and mixtures of these compounds.

The reaction may be carried out in stirred-tank reactors or in loop-reactors in which the liquid mixture to be hydrogenated is extracted from the reactor proper and circulated by means of a pump through a heat exchanger and reintroduced in the reactor where it is contacted with hydrogen. The reaction may be carried out in a continuous or batch-type operation. The catalyst of this invention may be added to the reaction medium as such, or in the form of a solution in an inert organic solvent of the above-mentioned type.

The amount of catalyst to be used is not critical and may vary within broad limits; it should be comprised between 0.001 and 10 millimoles per 100 g of substance to be hydrogenated, and preferably between 0.01 and 5 mmoles per 100 g of substance to be hydrogenated. Above 10 mmoles per 100 g of substance to be hydrogenated the hydrogenation is effective but uneconomical, and may require a step for the separation of the catalyst residues. In the hydrogenation of living polymers which contain active lithium in the polymer chain, the molar ratio of active lithium to titanium in the catalyst should be equal to or less than 25, because the lithium acts as a reducing agent and affects the activity of the catalyst; the molar Li/Ti ratio should preferably be equal to or less than 15.

The active lithium in the living polymer varies as a function of the molecular weight of the polymer, the functionality of the organolithium compound used as catalyst for the preparation of the polymer, and the percentage of deactivation and coupling of the active lithium. With a view to obtaining the desired molar ratio of active lithium to titanium, said ratio may be adjusted by deactivating part of the active lithium of the polymer through the addition of water, alcohol or halogen.

To achieve the selective hydrogenation of the double bonds of the copolymers of conjugated dienes with vinylaromatic compounds, reaction temperatures of between approximately 20° and 150° C., preferably between 50° and 100° C., and hydrogen pressures of between approximately 1 and 70 kg/cm$^2$, preferably between 4 and 12 kg/cm$^2$, should be used.

The hydrogenation catalysts in accordance with the invention make it possible to hydrogenate the olefinic double bonds to a substantial extent (more than 90%), and because of their high selectivity, they do not appreciably hydrogenate the aromatic nuclei (less than 1%). In certain cases it may be desirable to effect a partial hydrogenation of the double bonds, particularly in the case of polymers and copolymers. This can be readily achieved within the framework of the present invention by choosing suitable reaction conditions: type and concentration of catalyst, temperature, hydrogen pressure, reaction time, etc. The partially hydrogenated conjugated diene polymers may have important applications as compatibilizers in polymer mixtures, as additives for improving the processability of rubbers, and as additives for improving the freezing point of lubricating oils.

The hydrogenation catalysts forming the subject of the present invention are generally of sufficient activity by themselves and usually do not require the presence of other compounds. Nevertheless in some cases it may be advantageous—for increasing the activity and/or selectivity of the reaction—to reduce them before or during the course of the reaction with reducing organometallic compounds such as organolithium, organomagnesium or organoaluminum compounds. Examples of the aforementioned organolithium compounds are n-butyllithium, sec.-butyllithium, etc.; of the organomagnesium compounds: dibutylmagnesium, butyloctylmagnesium, etc.; and of the organoaluminum compounds: tri-isobutylaluminum, triethylaluminum, etc.

The products of hydrogenation may be readily separated from the solvent used by means of known processes such as distillation, precipitation, etc. In particular, the partially or completely hydrogenated polymers and copolymers may be separated from the solvent by various methods:

(1) By contacting the hydrogenated solution with a polar solvent such as acetone, methanol and the like, which, by being a poor solvent of the polymer, causes the latter's precipitation and permits its physical separation.

(2) By contacting the hydrogenated solution with water and steam and eliminating the solvent by evaporation, separating the water and drying the polymer.

(3) By direct evaporation of the solvent.

As indicated above, the amount of catalyst used within the framework of the present invention can be very small, and in view of the fact that the catalyst itself and its decomposition products are not corrosive and do not impart undesirable characteristics to the polymers, costly purification processes of the polymers to eliminate the catalytic residues are generally unnecessary.

Included below are a few explanatory examples of the process of the invention, without implying any limitation of said invention.

EXAMPLE 1

Preparation of the catalyst
bis-(4-methoxyphenyl)-bis-($\eta^5$-cyclopentadienyl)titanium In a 250-ml Schlenk tube is placed, in an argon atmosphere, 25 mmoles of 4-iodoanisole (4-iodomethoxybenzene), which is dissolved in dry ethyl ether. The solution is cooled to −78° C. in a bath of dry ice-acetone, and 25 mmoles of a 15% solution of n-butyllithium in hexane is added while stirring continuously. After a half hour of reaction the mixture is allowed to warm to room temperature, after which the yellowish solution of the lithium-containing compound is added, in an argon atmosphere, to a suspension of 12.5 mmoles of $Cp_2TiCl_2$ in ethyl ether cooled to 0° C. The mixture is allowed to warm to room temperature and after 2 hours the reaction mixture is filtered and the solvent eliminated in vacuo. The solid obtained in this manner is washed with petroleum ether, obtaining a red solid (yield=90%) which is identified as $Cp_2Ti(4-CH_3OPh)_2$ by $^1$H-NMR analysis [(δ: 3.62 (s, 6H, $OCH_3$) and δ: 6.07, s, 10H, Cp)].

EXAMPLE 2

Preparation of the catalyst
bis-(diphenylphosphinomethylene)-bis-($\eta^5$-cyclopentadienyl)titanium In a 250-ml Schlenk tube containing 25 moles of $LiCH_2PPh_2\times TMEDA$ (Inorg. Chem. 20, 3206 (1981) are added, in an argon atmosphere and at −78° C., 12 mmoles of $Cp_2TiCl_2$ and 100 ml of dry toluene cooled to −78° C.

After 30 minutes of reaction the mixture is allowed to warm slowly to room temperature, the stirring is continued for an additional 2 hours, after which the LiCl formed is separated by filtration and the solvent eliminated in vacuo. The resulting solid is washed twice with cold hexane, obtaining an orange-colored solid which is identified by $^1$H-NMR analysis as $Cp_2Ti(CH_2PPh_2)_2$ [δ: 1.65 (d, 4H, $^2J_{P\text{-}H}$=3.5 Hz) and δ: 5.88 (s, 10H, Cp)].

Hydrogenation of polymers

EXAMPLE 3

The hydrogenations of the polymers were carried out in an autoclave of 2 L internal capacity, with steel container, provided with a temperature control system, variable agitation and hydrogen flow meter, as well as with means for the passage of nitrogen and hydrogen, vent and polymer discharge. Subjected to hydrogenation is a block copolymer $SB_{mv}$ (styrene-butadiene medium vinyl) prepared by sequential addition of monomers, using THF (tetrahydrofuran) as polar modifier, whose composition by weight is: styrene (52.8%) and butadiene (47.2%) (vinyl content of the polybutadiene: 45.6%), with M.W.=75,000 and its polydispersity index=1.2.

22.5 g of said polymer dissolved in 1450 mL of cyclohexane is charged into the autoclave, followed by degassing and purging several times with hydrogen. The solution is heated, and upon reaching 83° C. there is added 0.90 mmole of bis-(4-methoxyphenyl)-bis-(cyclopentadienyl)titanium as catalyst dissolved in cyclohexane, whose preparation is described in Example 1. Pressurization with hydrogen is applied and a hydrogen pressure of 6 kg/cm² and a temperature of 85° C. are kept constant during the entire reaction. Absorption of hydrogen is observed from the moment that pressurization is applied. After 120 minutes the reaction mixture ceases to consume hydrogen, and the reaction is considered terminated. The reactor is cooled, depressurized and the resulting solution is poured on a steam-water mixture, whereby a polymer precipitates which is then dried in an oven. Its microstructure is analyzed by $^1$H-NMR, which indicates that it contains 91% of hydrogenated polybutadiene units, and the molecular weight determined by GPC (gel permeation chromatography) indicates no degradation of the polymer.

EXAMPLE 4

Using the same hydrogenation process as in Example 3, the catalyst employed in this case was the titanium compound $Cp_2Ti(CH_2PPh_2)_2$. The reactor is charged with 22.5 g of the polymer described in Example 3, dissolved in 1450 mL of cyclohexane. After attaining a temperature of 68° C. there is added 0.67 mmole of $CpCpTi(CH_2PPh_2)_2$ dissolved in cyclohexane. Pressurization with hydrogen is applied and a pressure of 6 kg/cm² and a temperature of 70° C. are kept constant during the entire reaction. A strong absorption of hydrogen is noted. After 15 minutes the consumption of hydrogen ceases, the reaction is considered terminated, the reactor is cooled, depressurized, and the resulting solution is poured on a steam-water mixture, whereby the polymer precipitates. The isolated polymer contains 100% of hydrogenated 1,2-polybutadiene units, and 67.5% of the 1,4 units. Hydrogenation of the polystyrene is not observed, nor is any degradation of the polymer noted.

EXAMPLE 5

A block copolymer SBmvS (styrene-average butadiene vinyl-styrene) is formed by sequential addition of monomers using n-butyllithium is initiator in a concentration of 1.55 mmol/l and an amount of THF (tetrahydrofuran) which corresponds to a radio of 40 moles per each mol of n-butyllithium. Once the polymerization reaction is complete, the polymer is deactivated by addition of BHT (2,6-di-tert-butyl-4-methylphenol). The solution obtained is poured in a steam-water mixture, thus precipitating the polymer which is subsequently dried at 80° C. during 24 h. The analysis of the resulting polymer shows a 25% contents by weight of styrene with a block styrene of 83.4%, a $30^a$ of unities 1,2 of butadiene and a molecular weight Mw=46000 being the polydispersity index 1.06.

Following the same procedure described in Example 3, the hydrogenation of copolymer SBmvS is carried out. 45 g of the said polymer solved in 1310 ml of cyclohexane is charged in the autoclave, and heated at 90° C. with 1.8 mmole of bis (4-methoxyphenyl)bis(cyclopentadienyl) titanium as catalyst dissolved in toluene. It is pressurized with hydrogen at 6 Kg/cm² and the hydrogenation is kept at 90° C. during 90 minutes. Once the reaction is finished the polymer is isolated analogously to Example 3. The analysis of the resulting polymer shows a 100% of the hydrogenation of the butadienic fraction without hydrogenation of the styrenic part or degradation of the polymer.

EXAMPLE 6

The following example refers to the hydrogenation of a polybutadiene having high contents in 1,4-trans unities. For the synthesis of the polymer the catalytic system is made up of bis(2-etylhexyl) phosphate of borium/n-butyl octyl magnesium/trietyl aluminum in the ratio 2:5:1, being the concentration of the alkyl magnesium of 1.50 mmole/l. The composition of the resulting polymer is: 5.25% by weight of unities of 1,2-butadiene, 75.5% of 1,4-trans unities and 19.2% of 1,4-cis, being the molecular weight Mw=281000 and its polydispersity index of 2.46.

Following the same hydrogenation process described in Example 3, 22.5% of the said polybutadiene diluted in 1450 ml of cyclohexane are charged, heated at 85° C. and 0.5 mmoles of bis(4-metoxyphenyl)bis(cyclopentadienyl) titanium dissolved in toluene are added. It is pressurized with hydrogen until 6 Kg/cm² and kept at 85° C. throughout the reaction. When 90 minutes have passed the consumption of hydrogen ceases whereby the reaction is finished, it is depressurized, the reactor is cooled and he polymer solution is discharged and isolated in the way described in Example 3. The polymer thus obtained contains 98% of the unities of the hydrogenated polybutadiene without modification of original distribution of molecular weights.

We claim:

1. Process of hydrogenation in solution of the double bonds of polymers or copolymers of conjugated dienes other than living polymers or copolymers and containing no lithium atom in the polymer chain, characterized by using homogeneous catalysts in the absence of reducing compounds, of the formula

$Cp_2Ti(PhOR)_2$ wherein Cp=N⁵: $C_5H_5$, Ph is a phenyl group and OR an alkoxide group containing between 1 and 4 carbon atoms; or homogeneous catalysts of the type

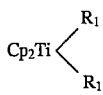

wherein $R_1$ a $CH_2PPH_2$ group.

2. Process of hydrogenation of polymers according to claim 1 wherein the hydrogenation catalyst is the compound bis-(4-methoxyphenyl)-bis-($\eta^5$-cyclopentadienyl) titanium.

3. Process of hydrogenation in solution of the double bonds of diene polymers or diene copolymers with vinylaromatic hydrocarbons according to claim 1, characterized in that the number-averaged molecular weights of the polymers are comprised between approximately 500 and 1,000,000.

4. Hydrogenation process according to claim 1 characterized in that the solvent of the solution is an aliphatic or cycloaliphatic hydrocarbon, an ether or an aromatic hydrocarbon.

5. Hydrogenation process according to claim 4 wherein the solvent is n-hexane, n-octane, isooctane, cyclohexane, methylcylopentane, tetahydrofuran, benzene, toluene, a xylene, or mixtures of these compounds.

6. Hydrogenation process in accordance with claim 1 characterized in that the hydrogenation is carried out at temperatures between 50° and 100° C. and at hydrogen pressures between 4 and 12 kg/cm².

7. Process according to claim 1 characterized by using catalyst amounts of between 0.01 and 5 millimoles per 100 g of substance to be hydrogenated.

8. Process according to claim 3 characterized in that the copolymer consists mainly of (a) 1,3-butadiene and/or isoprene and (b) styrene.

9. Process according to claim 8, characterized in that the copolymer is a block copolymer containing at least one polymer block A consisting of styrene and at least one polymer block B consisting mainly of 1,3-butadiene and/or isoprene, the content of block A in the copolymer being 10–90% by weight and the content of 1,2-vinyl units in block B being 25 to 75%.

10. Process according to claim 9, characterized in that more than 90% of the 1,3-butadiene and/or isoprene units and less than 1% of the styrene units are hydrogenated.

11. A hydrogenated block copolymer produced by a process according to claim 1 in which the catalyst renders distinctive properties to said block copolymer.

* * * * *